(12) United States Patent
Richards et al.

(10) Patent No.: US 10,052,948 B2
(45) Date of Patent: Aug. 21, 2018

(54) DRIVELINE AND METHOD OF CONTROLLING A DRIVELINE

(71) Applicant: JAGUAR LAND ROVER LIMITED, Warwickshire (GB)

(72) Inventors: Karl Richards, Coventry (GB); Simon Owen, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 175 days.

(21) Appl. No.: 15/035,027

(22) PCT Filed: Oct. 29, 2014

(86) PCT No.: PCT/EP2014/073210
§ 371 (c)(1),
(2) Date: May 6, 2016

(87) PCT Pub. No.: WO2015/067508
PCT Pub. Date: May 14, 2015

(65) Prior Publication Data
US 2016/0297299 A1    Oct. 13, 2016

(30) Foreign Application Priority Data

Nov. 7, 2013   (GB) .................................. 1319641.5

(51) Int. Cl.
| | |
|---|---|
| *B60K 17/35* | (2006.01) |
| *B60K 23/08* | (2006.01) |
| *F16D 48/06* | (2006.01) |

(52) U.S. Cl.
CPC .............. *B60K 17/35* (2013.01); *B60K 23/08* (2013.01); *B60K 23/0808* (2013.01);
(Continued)

(58) Field of Classification Search
CPC ...... B60K 17/35; B60K 23/088; B60K 23/08; B60K 2032/0858; B60K 17/3515;
(Continued)

(56) References Cited

U.S. PATENT DOCUMENTS

| | | |
|---|---|---|
| 4,866,624 A | 9/1989 | Nishikawa et al. |
| 5,839,084 A | 11/1998 | Takasaki et al. |

(Continued)

FOREIGN PATENT DOCUMENTS

| | | |
|---|---|---|
| GB | 2308170 A | 6/1997 |
| GB | 2407804 A | 5/2005 |

(Continued)

OTHER PUBLICATIONS

International Search Report and Written Opinion of the International Searching Authority for International Application No. PCT/EP2014/073210 dated Feb. 6, 2015.

(Continued)

*Primary Examiner* — David J Hlavka
(74) *Attorney, Agent, or Firm* — Carlson, Gaskey & Olds

(57) ABSTRACT

Embodiments of the present invention provide a motor vehicle controller comprising a computing device, the controller being configured to command a first releasable torque transmitting device of a drive-line to switch between a released condition in which a first releasable torque transmitting device substantially prevents transmission of torque from an input to an output portion thereof, and an engaged condition in which a releasable torque transmitting device allows torque transmission from an input portion to an output portion thereof. The controller may be configured to receive information indicative of: a speed of wheels of a first axle; a speed of wheels of a second axle; and a terrain over which a vehicle is driving. The controller may be configured, in response to a detected disparity between the speed of (Continued)

wheels of said first and second axle when said first releasable torque transmitting device is switched to said engaged condition, in dependence upon said received information indicative of the terrain over which the vehicle is travelling, either: output a signal to automatically cause said first releasable torque transmitting device to perform a reconnect operation comprising momentarily resuming the released condition, and then subsequently resuming the engaged condition, or maintain said first releasable torque transmitting device in said engaged position.

21 Claims, 4 Drawing Sheets

(52) U.S. Cl.
CPC .......... *F16D 48/06* (2013.01); *B60K 17/3515* (2013.01); *B60K 2023/0858* (2013.01); *F16D 2500/1045* (2013.01); *F16D 2500/10431* (2013.01); *F16D 2500/10456* (2013.01); *F16D 2500/1117* (2013.01); *F16D 2500/312* (2013.01); *F16D 2500/3115* (2013.01); *F16D 2500/3124* (2013.01); *F16D 2500/3125* (2013.01); *F16D 2500/3127* (2013.01); *F16D 2500/50825* (2013.01); *F16D 2500/50858* (2013.01); *F16D 2500/7041* (2013.01)

(58) Field of Classification Search
CPC ............. F16D 48/06; F16D 2500/1045; F16D 2500/50825; F16D 2500/3127; F16D 2500/3125; F16D 2500/3124; F16D 2500/312; F16D 2500/1117; F16D 2500/10431; F16D 2500/7041; F16D 2500/50858; F16D 2500/10456; F16D 2500/3115

See application file for complete search history.

(56) References Cited

U.S. PATENT DOCUMENTS

| | | | |
|---|---|---|---|
| 5,980,415 A | 11/1999 | Showalter | |
| 2001/0005805 A1* | 6/2001 | Saotome | ................. F16D 48/06 701/67 |
| 2013/0260959 A1 | 10/2013 | Quehenberger et al. | |
| 2016/0167655 A1* | 6/2016 | Minami | .............. B60W 30/188 477/176 |
| 2016/0347171 A1* | 12/2016 | Ogawa | ................. B60W 40/114 |
| 2017/0166052 A1* | 6/2017 | Ogawa | ................... B60K 23/08 |
| 2017/0182887 A1* | 6/2017 | Ogawa | ................... B60K 23/08 |

FOREIGN PATENT DOCUMENTS

| | | |
|---|---|---|
| GB | 2488241 A | 8/2012 |
| GB | 2488410 A | 8/2012 |
| GB | 2492655 A | 1/2013 |
| JP | S60-009739 U | 1/1985 |
| JP | 2010149850 | 7/2010 |
| WO | 2012/110659 A1 | 8/2012 |
| WO | 2012146785 | 11/2012 |
| WO | 2012146786 | 11/2012 |
| WO | 2013/004764 A1 | 1/2013 |

OTHER PUBLICATIONS

Combined Search and Examination Report under Sections 17 and 18(3) for Application No. GB1319641.5 dated Jun. 4, 2014.
Combined Search and Examination Report under Sections 17 and 18(3) for Application No. GB1419217.3 dated Apr. 28, 2015.

* cited by examiner

DRIVELINE AND METHOD OF CONTROLLING A DRIVELINE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline to two of the wheels when a prescribed condition is met so that the vehicle operates in a two wheel drive mode. The system automatically reconnects the driveline to enable four wheel drive operation when the prescribed condition is not met.

It is known to provide a front wheel drive vehicle having a dynamic driveline that includes a power transfer unit (PTU) that includes a clutch device having a synchroniser. The PTU is configured to connect a prop shaft of the vehicle to a transmission of the vehicle in order to drive rear wheels of the vehicle. The PTU can connect and disconnect the prop shaft from the transmission whilst the vehicle is moving.

It is to be understood that reconnect operations are known to be performed where the releasable torque transmitting device includes a clutch device having a synchroniser. The clutch device may for example be a dog-clutch device or a single or multi-plate clutch device. The synchroniser device is configured to synchronise a speed of rotation of the input and output portions of the clutch device prior to closure of the clutch device, and may occasionally fail correctly to close, resulting in slippage between the input and output portions of the clutch device. If a vehicle accelerates relatively harshly, front wheels of the vehicle may suffer spin that is significantly greater than that of rear wheels of the vehicle. One way to remedy the situation is to perform a reconnect operation. Accordingly, in some known vehicles a reconnect operation may be triggered in dependence on the speed of a first set of wheels with respect to a second set, for example when a speed of front wheels of the vehicle exceeds that of rear wheels of the vehicle by more than a prescribed amount. In some known vehicles the reconnect operation may be repeated several times in rapid succession in order to attempt to ensure that the clutch device closes correctly.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a controller, a control system, a motor vehicle, a computer readable medium and a method.

In an aspect of the invention for which protection is sought there is provided a motor vehicle controller comprising a computing device, the controller being configured to command a first releasable torque transmitting device of a driveline to switch between a released condition in which a first releasable torque transmitting device substantially prevents transmission of torque from an input to an output portion thereof, and an engaged condition in which a releasable torque transmitting device allows torque transmission from an input portion to an output portion thereof, wherein
  the controller is configured to receive information indicative of: a speed of wheels of a first axle; a speed of wheels of a second axle; and a terrain over which a vehicle is driving, and
  in response to a detected disparity between the speed of wheels of said first and second axle when said first releasable torque transmitting device is switched to said engaged condition, said controller is configured to, in dependence upon said received information indicative of the terrain over which the vehicle is travelling, either:
  output a signal to automatically cause said first releasable torque transmitting device to perform a reconnect operation comprising momentarily resuming the released condition, and then subsequently resuming the engaged condition, or
  maintain said first releasable torque transmitting device in said engaged position.

It is known to provide a front wheel drive vehicle having a dynamic driveline that includes a power transfer unit (PTU) that includes a clutch device having a synchroniser. The PTU is configured to connect a prop shaft of the vehicle to a transmission of the vehicle in order to drive rear wheels of the vehicle. The PTU can connect and disconnect the prop shaft from the transmission whilst the vehicle is moving.

It is to be understood that reconnect operations are known to be performed where the releasable torque transmitting device includes a clutch device having a synchroniser. The clutch device may for example be a dog-clutch device or a single or multi-plate clutch device. The synchroniser device is configured to synchronise a speed of rotation of the input and output portions of the clutch device prior to closure of the clutch device, and may occasionally fail correctly to close, resulting in slippage between the input and output portions of the clutch device. If a vehicle accelerates relatively harshly, front wheels of the vehicle may suffer spin that is significantly greater than that of rear wheels of the vehicle. One way to remedy the situation is to perform a reconnect operation. Accordingly, in some known vehicles a reconnect operation may be triggered in dependence on the speed of a first set of wheels with respect to a second set, for example when a speed of front wheels of the vehicle exceeds that of rear wheels of the vehicle by more than a prescribed amount. In some known vehicles the reconnect operation may be repeated several times in rapid succession in order to attempt to ensure that the synchroniser closes correctly. It is to be understood that momentarily resuming the released condition means temporarily, i.e. for only a short time period, for example less than one second, less than 500 ms or less than 250 ms, resuming the released condition.

Controllers according to embodiments of the present invention represent an advance over known vehicle systems at least in part because reconnect operations are triggered in dependence on the at least one characteristic of terrain over which a vehicle is driving as well as the relative speeds of wheels of respective axles, such as front and rear axles of a two-axle vehicle. Embodiments of the present invention have the advantage that the reconnect operation may be prevented from occurring when the vehicle is driving over certain terrain where a reconnect operation may be inadvisable. As discussed in more detail below, the reconnect operation may be prevented from occurring under all or only certain off-road conditions, such as when driving on sand.

It is to be understood that differences in speed between respective axles of a vehicle may develop due to features of the terrain over which a vehicle is driving and not just failure of a synchroniser correctly to close. For example, whilst driving off-road it is not uncommon for front wheels of a vehicle to drive on terrain having a lower different surface coefficient of friction to that on which rear wheels are driving, causing front wheels of the vehicle to suffer slip whilst rear wheels suffer little or no slip. Furthermore, when driving over rough terrain at speed, such as over sand having a rippled surface, front wheels of a vehicle can temporarily lose contact with ground (sand), resulting in momentary acceleration of the wheels to a speed exceeding that of the rear wheels, which remain in contact with ground.

The present applicant has recognised that it may be highly undesirable to command opening of releasable torque transmitting means such as a clutch device when driving off-road under these circumstances. This is at least in part because traction achieved by the slower-turning rear wheels, which remain in contact with ground, may be important in ensuring progress of a vehicle over terrain, particularly when driving over sand as described above. Embodiments of the present invention have the advantage that compromise of progress of a vehicle over terrain by the triggering of a reconnect operation when a vehicle is travelling over certain types of terrain, optionally terrain such as sand, may be prevented.

It is to be understood that by reference to an axle of a vehicle is meant a given transverse pair of wheels such as a front pair of wheels or a rear pair of wheels, whether or not the wheels are connected.

Optionally, the controller is configured to either: output a signal to automatically cause said first releasable torque transmitting device to perform a reconnect operation comprising resuming the released condition momentarily, before subsequently resuming the engaged condition, or maintain said first releasable torque transmitting device in said engaged position, in further dependence at least in part on an amount of torque developed by a powertrain at a prescribed location of a powertrain. It will be understood that the prescribed location of the powertrain may be the powertrain torque applied to the input shaft of a clutch of the PTU, or a location of the powertrain upstream, i.e. in the direction of the engine, of the PTU.

It is to be understood that in some embodiments, performance of a reconnect operation may be suspended if an amount of powertrain torque exceeds a predetermined amount, and one or more conditions are met in respect of the information in respect of a speed of wheels of the first axle with respect to wheels of a second axle and the at least one characteristic of terrain over which a vehicle is driving. If powertrain torque is less than the prescribed amount, a reconnect operation may be permitted even if the one or more conditions are met in respect of the information in respect of a speed of wheels of the first axle with respect to wheels of a second axle and the at least one characteristic of terrain over which a vehicle is driving.

The controller may be configured to either: output a signal to automatically cause said first releasable torque transmitting device to perform a reconnect operation comprising momentarily resuming the released condition, before subsequently resuming the engaged condition, or maintain said first releasable torque transmitting device in said engaged position, in dependence on the information in respect of a speed of wheels of a first axle with respect to wheels of a second axle when the received information indicative of the terrain over which the vehicle is travelling meets one or more predetermined conditions.

The controller may be configured to output said signal to automatically cause said first releasable torque transmitting device to perform a reconnect operation if a speed of a wheel of a first axle exceeds that of a second axle by more than a prescribed amount when the received information indicative of the terrain over which the vehicle is travelling meets said or more predetermined conditions.

It is to be understood that the controller may receive information indicative of the terrain over which the vehicle is travelling by reference to a signal indicative of the terrain. In some embodiments the controller may receive information indicative of the terrain by reference to an image signal, the signal carrying one or more images of terrain over which the vehicle is travelling. The image may be obtained by means of a camera device.

Optionally, the one or more predetermined conditions comprise one or more of: the controller received information indicative that a gradient of terrain exceeds a prescribed gradient in an uphill direction; the terrain over which a vehicle is moving consists essentially of sand; and the vehicle is configured in a sand mode of operation.

Optionally, the controller is configured to receive information indicative of a terrain over which a vehicle is driving by receiving a signal indicative of the identity of an operating mode in which a vehicle is operating, the operating mode being selected from a plurality of operating modes.

Optionally, the controller is configured to in determining whether to output said signal, determine from signals indicative of the terrain over which a vehicle is driving, which of a plurality of operating modes a vehicle is operating in.

The controller may be configured to determine whether to output said signal in dependence on a state of a manual operating mode selector dial.

The controller may be configured to determine whether to output said signal in dependence upon determining which of the plurality of operating modes has been selected automatically by automatic operating mode selection means.

In a further aspect of the invention for which protection is sought there is provided a motor vehicle control system comprising a controller according to a preceding aspect.

The operating modes may be control modes of at least one subsystem of a vehicle, the control system having a subsystem controller for initiating control of a vehicle subsystem in the selected one of the plurality of subsystem control modes, each one of the operating modes corresponding to one or more different driving conditions for a vehicle.

Optionally, the system comprises evaluation means for evaluating one or more driving condition indicators to determine the extent to which each of the subsystem control modes is appropriate.

The evaluation means may be comprised by the automatic operating mode selection means.

The control system may be operable in an automatic operating mode selection condition in which the system is configured automatically to control the subsystem controller to initiate control of the or each subsystem in the subsystem control mode which is most appropriate.

The operating modes may include one or more control modes selected from the following:

control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

Optionally, in each operating mode the system is configured to cause each one of a plurality of vehicle subsystems to be operated in a subsystem configuration mode appropriate to the driving condition.

The system may further comprise a first releasable torque transmitting device of a driveline.

Said first releasable torque transmitting device of a driveline may be configured to, in response to said signal output by said controller, switch between the engaged position to a released condition and back to an engaged position, so as to perform a reconnect operation.

In a further aspect of the invention for which protection is sought there is provided a vehicle comprising a control system according to a preceding aspect of the invention.

Optionally, the first releasable torque transmitting means comprises a clutch device. The clutch device may comprise an interference-type clutch.

It is to be understood that interference-type clutches include for example a dog clutch or the like.

The clutch device may comprise a friction clutch device.

The friction clutch device may be a plate-type device such as a single or multi-plate clutch (MPC), optionally a multi-plate wet clutch device.

Optionally the clutch device comprises the input portion, the output portion and a synchroniser for synchronising a speed of rotation of the input and output portions when the first releasable torque transmitting means transitions from the released condition to the engaged condition.

In one aspect of the invention for which protection is sought there is provided a method of controlling a motor vehicle having a driveline, the method being implemented by means of a computing device, the device being configured to command a first releasable torque transmitting device of the driveline to switch between a released condition in which said first releasable torque transmitting device substantially prevents transmission of torque from an input to an output portion thereof, and an engaged condition in which a releasable torque transmitting device allows torque transmission from an input portion to an output portion thereof, the method comprising:

receiving by means of a controller information indicative of: a speed of wheels of a first axle; a speed of wheels of a second axle; and a terrain over which a vehicle is driving, and detecting a disparity between the speed of wheels of said first and second axle when said first releasable torque transmitting device is in said engaged condition, when a disparity is detected the method comprising, in dependence upon said received information indicative of the terrain over which the vehicle is travelling either:

outputting a signal to automatically cause said first releasable torque transmitting device to perform a reconnect operation comprising a momentary resumption of the released condition, and subsequently resuming the engaged condition, or maintaining said first releasable torque transmitting device in said engaged position.

Some embodiments of the present invention provide a motor vehicle controller comprising a computing device, the controller being configured to command a first releasable torque transmitting device of a driveline to switch between a released condition in which a first releasable torque transmitting device substantially prevents transmission of torque from an input to an output portion thereof, and an engaged condition in which a releasable torque transmitting device allows torque transmission from an input portion to an output portion thereof.

The controller may be configured to receive information indicative of: a speed of wheels of a first axle; a speed of wheels of a second axle; and a terrain over which a vehicle is driving. The controller may be configured, in response to a detected disparity between the speed of wheels of said first and second axle when said first releasable torque transmitting device is switched to said engaged condition, in dependence upon said received information indicative of the terrain over which the vehicle is travelling, either: output a signal to automatically cause said first releasable torque transmitting device to perform a reconnect operation comprising momentarily resuming the released condition, and then subsequently resuming the engaged condition, or maintain said first releasable torque transmitting device in said engaged position.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which.

DETAILED DESCRIPTION

Figure 1:
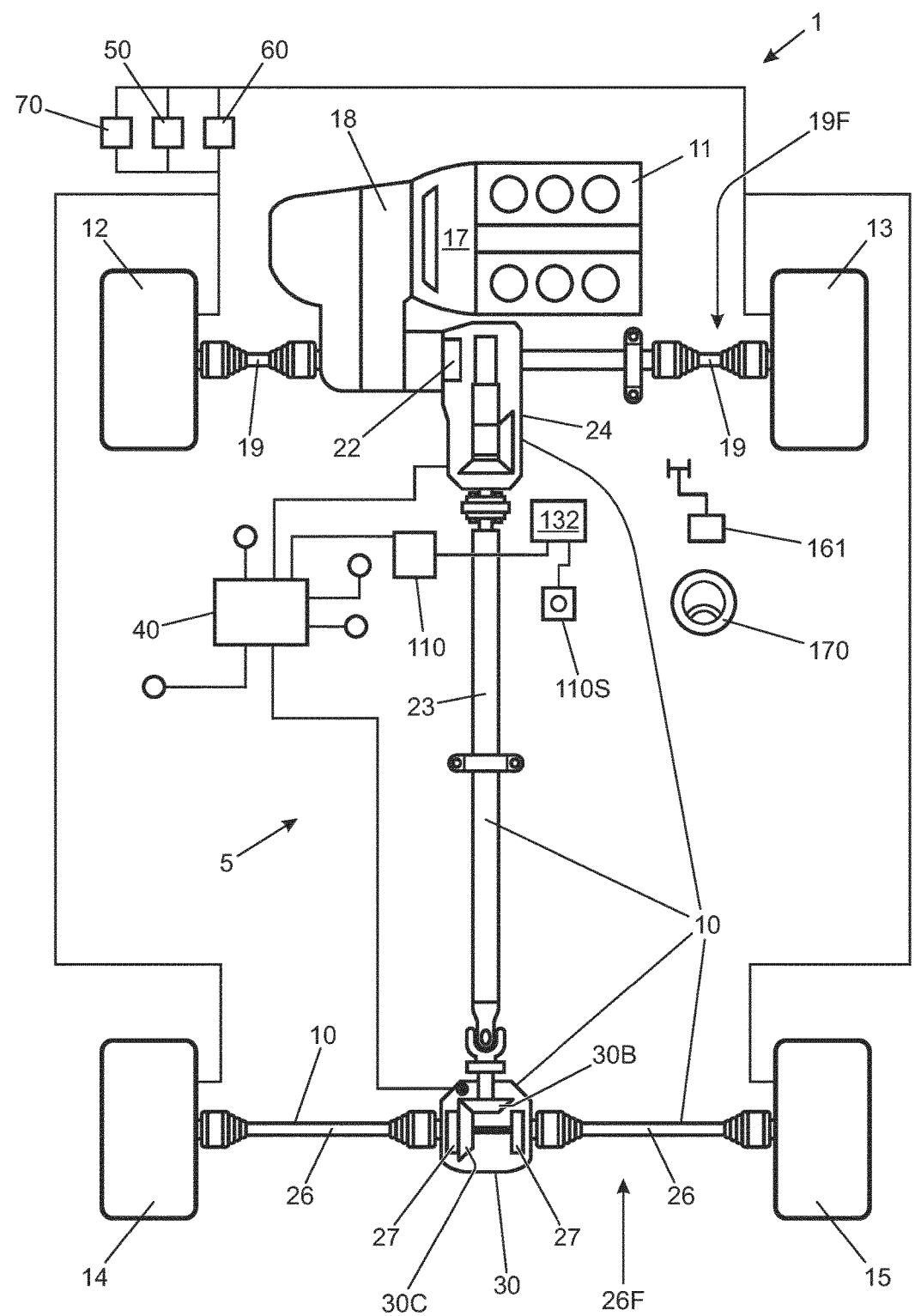
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. In the embodiment of FIG. 1 the PTC 22 includes a synchroniser device and a dog-clutch device, illustrated in more detail in FIG. 2. The synchroniser device 22syn is coupled in parallel with the dog clutch device 22dog and is arranged to accelerate an output shaft of the PTC 22 (and therefore the dog clutch device 22dog and prop shaft 23) to substantially the same speed as the input shaft of the PTC 22 prior to closure of the dog clutch device 22dog.

Figure 2:
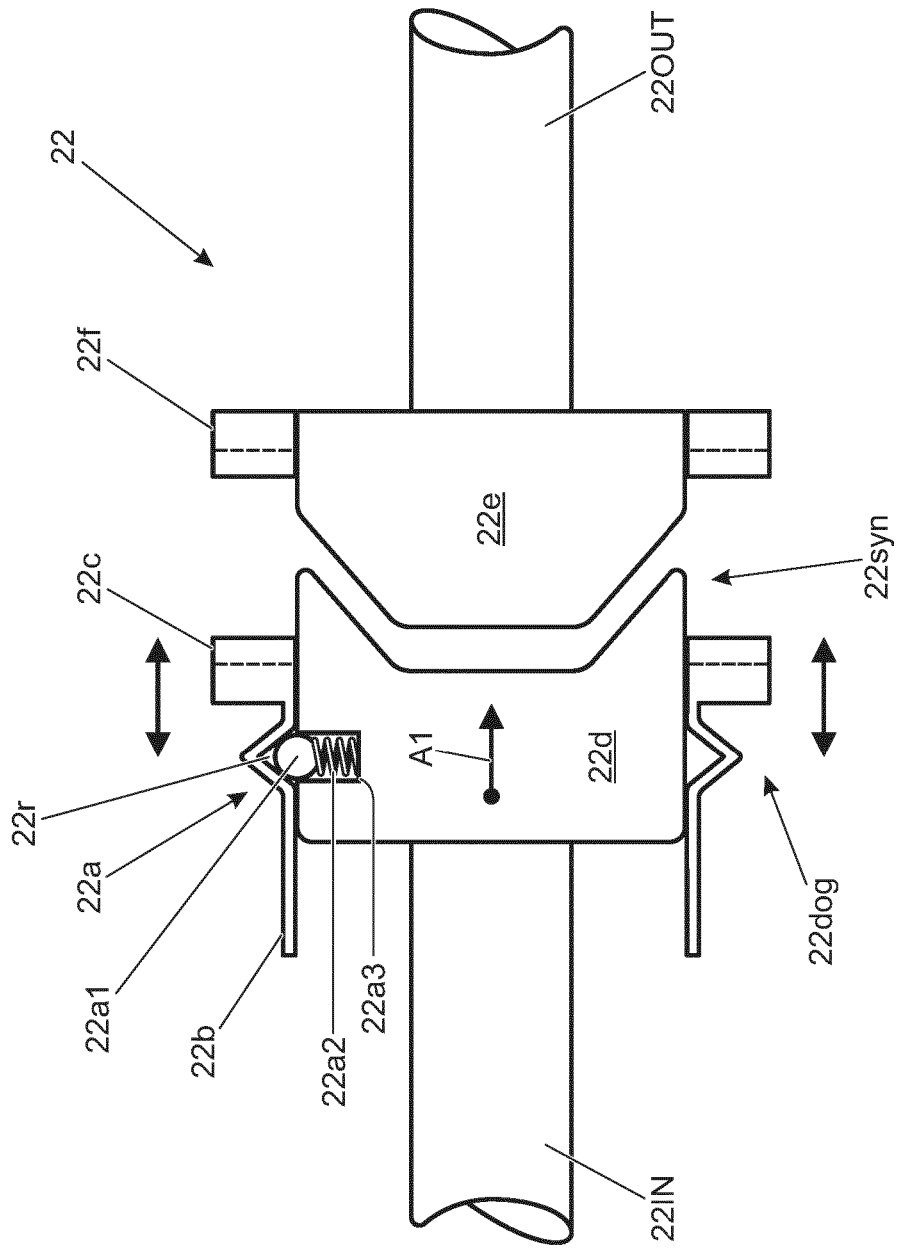
FIG. 2 is a schematic illustration of a known power transfer clutch employed in the embodiment of FIG. 1.

As shown in FIG. 2, the PTC 22 has an input shaft 22IN and an output shaft 22OUT. The input shaft 22IN is coupled to a female portion 22d of synchroniser 22syn of the PTC 22 whilst the output shaft 22OUT is coupled to a male portion 22e of the synchroniser 22syn. A ring member 22b of the PTC 22 carries a first dog clutch element 22c whilst the male portion 22e of synchroniser 22syn carries a second dog clutch element 22f. The first and second dog clutch elements 22c, 22f each have respective tooth formations provided around a circumference thereof, the teeth of respective elements 22c, 22f facing towards one another and being arranged to engage with one another when ring member 22b is moved towards the second dog clutch element 22f.

The ring member 22b is provided with a recess 22r that is arranged to cooperate with a sprung ball bearing 22a1 that is held captive in a recess 22a3 provided in the female portion 22d of the synchroniser 22syn. The ball bearing is sprung in a direction outwardly of the recess 22a3 and forms a detent arrangement with recess 22r of the ring member 22b. With the ball bearing 22a1 captured within recess 22r of the ring member 22b, the PTC 22 is in a disconnected state in which substantially no torque is transmitted between input and output shafts 22IN, 22OUT if either shaft 22IN, 22OUT is rotated.

If a force is applied to ring member 22b, for example by means of an actuator, to urge the ring member 22b towards the second dog clutch element 22f, the female portion 22d of the synchroniser 22syn is arranged to slide with respect to the input shaft 22IN towards the male portion 22e and into abutment therewith. Translation of the female portion 22d occurs whilst ball bearing 22a1 remains captured by recess 22r.

If a sufficient force is applied to the ring member 22b, the ball bearing 22a1 is released from the recess 22r and the first dog clutch element 22c slides into engagement with second dog clutch element 22f. It is to be understood that the detent arrangement is configured such that a force required to release ball bearing 22a1 from recess 22r is sufficiently high to ensure that a speed of rotation of the male portion 22e of the synchroniser 22syn (and therefore of output shaft 22OUT) is substantially equal to that of the female portion 22d (and therefore of input shaft 22IN) when the first dog clutch element 22c slides into engagement with second dog clutch element 22f.

The first and second dog clutch elements 22c, 22f are arranged to be held in an engaged (meshed) condition by force applied to the ring member 22b in a direction towards the second dog clutch element 22f. In some embodiments the force is supplied by an actuator that translates the ring member 22b towards and away from the second dog clutch element 22f.

In some alternative known dog clutch devices, when the ring member 22b slides to cause engagement of the first and second dog clutch elements 22c, 22f together, the ring member 22b becomes releasably locked in a closed position in which the first and second dog clutch elements 22c, 22f are retained in an engaged (meshed) condition by a locking device. In such devices an actuator that slides the ring member 22b towards and away from the second dog clutch element 22*f* is not required to apply continual force to the ring member 22*b* in order to maintain the clutch device in the closed condition. The locking device may comprise a detent arrangement, for example a ball-bearing detent arrangement similar to that illustrated in FIG. 2 or any other suitable detent arrangement.

Other clutch arrangements are also useful, including known dog clutch devices having a blocker ring for preventing engagement of the first and second dog clutch elements 22*c*, 22*f* until the speed of rotation of the elements 22*c*, 22*f* has been matched. A synchroniser sleeve element of known type may be provided coaxial with the female portion 22*d* of the synchroniser 22syn and employed to slide the first and second dog clutch elements 22*c*, 22*f* into the engaged condition.

It is to be understood that clutch devices other than interference or dog clutch devices are useful including plate clutches and the like may be used in place of the dog clutch. In such devices the synchroniser may be employed to match the speed of rotation of input and output portions of the clutch device when the clutch transitions from the released condition to the engaged condition.

The prop shaft 23 is coupled in turn to a rear drive unit (RDU) 30 operable to couple the prop shaft 23 to the rear drive shafts 26.

The RDU 30 (FIG. 1) has a pair of clutches 27 by means of which the RDU 30 is operable to connect the prop shaft 23 to the rear drive shafts 26 when the four wheel drive mode of operation is required. An input shaft of each of the clutches 27 is driven by a crown wheel 30*c* which is in turn driven by a bevel gear 30*b* that is fixedly coupled to the prop shaft 23.

The controller 40 of the driveline 5 is arranged to control operation of the PTU 24 and clutches 27 of the RDU 20. When a four wheel drive mode of operation is required the controller 40 is arranged to close the PTC 22 and to close clutches 27 of the differential 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller.

In the embodiment of FIG. 1 the PTC 22 and differential clutches 27 have respective actuators operable to close the respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the closed (or 'fully closed') condition. In the case of a multi-plate wet clutch the maximum amount of torque the clutch can transmit may be responsive at least in part to an amount of pressure applied to the plates of the clutch.

It is to be understood that in the present embodiment the controller 40 is operable to control the driveline 5 to assume the four wheel drive mode responsive to a selection of a required vehicle operating mode or characteristic by a driver, or automatically, in response to a value of one or more vehicle operating parameters. Thus, if the driveline 5 is in the two wheel drive mode and the controller 40 detects that an amount of wheel slip exceeds a prescribed value, the controller may control the driveline 5 automatically to assume the four wheel drive mode. It is to be understood that a transition to the four wheel drive mode of the driveline 5 may be more urgent in some situations where the controller 40 determines automatically that the four wheel drive mode is required, compared with other situations where a requirement to assume four wheel drive mode is in response to (say) driver selection of a particular vehicle operating mode. Accordingly, in some embodiments the transition may be made more rapidly if the transition is more urgent.

In some embodiments, driveline torque may be taken into account in determining when a transition from the two wheel mode to the four wheel mode is required. By driveline torque is meant the amount of torque at a given position of the driveline 5 and may be determined, by way of example, by reference to engine output shaft torque and a gear ratio between the engine output shaft and the given position of the driveline 5. This value of torque may be used in addition to or instead of engine output torque in order to determine when a transition from two wheel drive to four wheel drive mode should be commanded.

The vehicle 1 is provided with an antilock braking system (ABS) controller 50 arranged to control a brake of one or more wheels of the vehicle 1 to reduce an amount of braking action when required in order to prevent skidding. The vehicle 1 also has a dynamic stability control system controller (DSC) 60 arranged to control an amount of torque delivered to one or more wheels of the vehicle to prevent wheel slip.

Furthermore, the vehicle 1 may have a traction control system (TCS) 70 arranged to monitor wheels of the vehicle 1 and to apply a brake to a wheel in the event that it is determined that the wheel is rotating at a speed that is higher than that required for substantially no wheel slip to occur.

Figure 3:
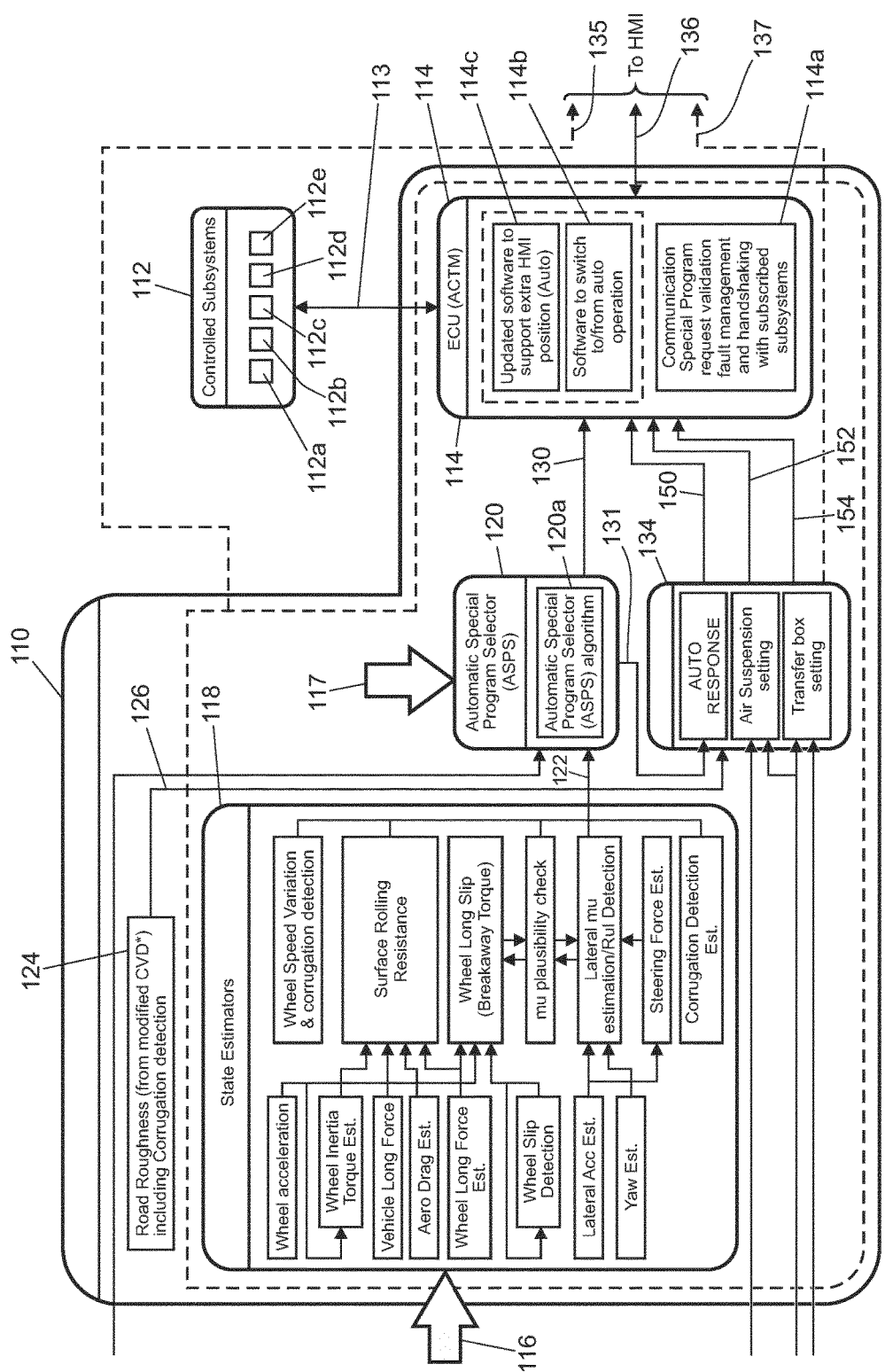
FIG. 3 is a schematic illustration of a portion of a control system of the vehicle according to the embodiment of FIG. 1.

The vehicle 1 of FIG. 1 has a vehicle control unit (VCU) 110. FIG. 3 shows the VCU 110 in more detail. The VCU 110 is operable to control a plurality of vehicle subsystems 112 including, but not limited to, an engine management system 112*a*, a transmission system 112*b*, an electronic power assisted steering unit 112*c* (ePAS unit), a brakes system 112*d* that includes ABS controller 50 and a suspension system 121*e*. Although five subsystems are illustrated as being under the control of the VCU 110, in practice a greater number of vehicle subsystems may be included on the vehicle and may be under the control of the VCU 110. The VCU 110 includes a subsystem control module 114 which provides control signals via line 113 to each of the vehicle subsystems 112 to initiate control of the subsystems in a manner appropriate to the driving condition, such as the terrain or driving surface, in which the vehicle is travelling (referred to as the terrain condition). The subsystems 112 also communicate with the subsystems control module 114 via signal line 113 to feedback information on subsystem status.

As described in more detail below, the VCU 110 is operable to control the subsystems to operate in one of a plurality of control modes. In each control mode, each subsystem is caused to assume one of a plurality of subsystem configuration modes. The control modes include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

A user may select a required control mode by means of control mode selector 110S shown in FIG. 1. The selector 110S is in the form of a dial that may be rotated to select the appropriate control mode. Systems implementing this functionality are known, and are described for example in US2003/0200016, the content of which is hereby incorporated by reference.

In addition to allowing manual section of a required control mode, the VCU 110 may also be configured to determine automatically an appropriate control mode when the VCU 110 placed in an automatic mode selection mode or condition as described further below.

The VCU 110 receives a plurality of signals, represented generally at 116 and 117, from a plurality of vehicle sensors and are representative of a variety of different parameters associated with vehicle motion and status. As described in further detail below, the signals 116, 117 provide, or are used to calculate, a plurality of driving condition indicators (also referred to as terrain indicators) which are indicative of the nature of the condition in which the vehicle is travelling. One advantageous feature of some embodiments of the present invention is that the VCU 110 determines the most appropriate control mode for the various subsystems on the basis of the terrain indicators, and automatically controls the subsystems accordingly.

The sensors (not shown) on the vehicle include, but are not limited to, sensors which provide continuous sensor outputs 116 to the VCU 110, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of SCS 60), a brake pedal position sensor, an acceleration pedal position sensor and longitudinal, lateral, vertical motion sensors.

In other embodiments, only a selection of the aforementioned sensors may be used. The VCU 110 also receives a signal from the electronic power assisted steering unit (ePAS unit 112c) of the vehicle 1 to indicate the steering force that is applied to the wheels (steering force applied by the driver combined with steering force applied by the ePAS unit 112c).

The vehicle 1 is also provided with a plurality of sensors which provide discrete sensor outputs 117 to the VCU 110, including a cruise control status signal (ON/OFF), a transfer box or PTU status signal 137 (indicating whether a gear ratio of the PTU 137 is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension status signal (HI/LO), and a Dynamic Stability Control (DSC) signal (ON/OFF). It is to be understood that the SCS and DSC signals each provide an indication as to whether the SCS or DSC systems are currently intervening to cause application of brake torque and/or powertrain torque, as appropriate, to improve vehicle stability.

The VCU 110 includes an evaluation means in the form of an estimator module or processor 118 and a calculation and selection means in the form of a selector module or processor 120. Initially the continuous outputs 116 from the sensors are provided to the estimator module 118 whereas the discrete signals 117 are provided to the selector module 120.

Within a first stage of the estimator module 118, various ones of the sensor outputs 116 are used to derive a number of terrain indicators. In a first stage of the estimator module 118, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 118 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 118 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. Each of these indicate that a slip event has occurred and the SCS ECU has taken action to control it. The estimator module 118 also uses the outputs from the wheel speed sensors to determine a wheel speed variation and corrugation detection signal.

On the basis of the windscreen wiper signal (ON/OFF), the estimator module 118 also calculates how long the windscreen wipers have been in an ON state (i.e. a rain duration signal).

The VCU 110 also includes a road roughness module 124 for calculating the terrain roughness based on the air suspension sensors (the ride height sensors) and the wheel accelerometers. A terrain indicator signal in the form of a roughness output signal 126 is output from the road roughness module 124.

The estimates for the wheel longitudinal slip and the lateral friction estimation are compared with one another within the estimator module 118 as a plausibility check.

Calculations for wheel speed variation and corrugation output, the surface rolling resistance estimation, the wheel longitudinal slip and the corrugation detection, together with the friction plausibility check, are output from the estimator module 118 and provide terrain indicator output signals 122, indicative of the nature of the terrain in which the vehicle is travelling, for further processing within the VCU 110.

The terrain indicator signals 122 from the estimator module 118 are provided to the selector module 120 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 122, 126 from the estimator module 118 and the road roughness module 124.

The vehicle subsystems 112 may be controlled automatically (referred to as the "automatic mode") in response to a control output signal 130 from the selector module 120 and without the need for driver input. Alternatively, the vehicle subsystems 112 may be operated in response to a manual driver input (referred to as "manual mode") via a Human Machine Interface (HMI) module 132. The subsystem controller 114 may itself control the vehicle subsystems 112a-112e directly via the signal line 113, or alternatively each subsystem may be provided with its own associated intermediate controller (not shown in FIG. 8) for providing control of the relevant subsystem 112a-112e. In the latter case the subsystem controller 114 may only control the selection of the most appropriate subsystem control mode for the subsystems 112a-112e, rather than implementing the actual control steps for the subsystems. The or each intermediate controller may in practice form an integral part of the main subsystem controller 114.

When operating in the automatic mode, the selection of the most appropriate subsystem control mode is achieved by means of a three phase process:
(1) for each type of control mode, a calculation is performed of the probability that the control mode is suitable for the terrain over which the vehicle is travelling, based on the terrain indicators;
(2) the integration of "positive differences" between the probability for the current control mode and the other control modes; and
(3) the program request to the control module 114 when the integration value exceeds a pre-determined threshold or the current terrain control mode probability is zero. The specific steps for phases (1), (2) and (3) will now be described in more detail.

In phase (1), the continuous terrain indicator signals in the form of the road surface roughness output 126 and the outputs 122 from the estimator module 118 are provided to the selector module 120. The selector module 120 also receives the discrete terrain indicators 117 directly from various sensors on the vehicle, including the PTU status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 120.

The selector module 120 is provided with a probability algorithm 120a for calculating the most suitable control mode for the vehicle subsystems based on the discrete terrain indicator signals 117 received directly from the sensors and the continuous terrain indicators 122, 126 calculated by the estimator module 118 and the road surface roughness module 124, respectively.

For each subsystem control mode, the algorithm 120a within the selector module 120 performs a probability calculation, based on the terrain indicators, to determine a probability that each of the different control modes is appropriate. The selector module 120 includes a tuneable data map which relates the continuous terrain indicators 122, 126 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 117 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 117, 122, 126. In the following equation, for each control mode the individual probability as determined for each terrain indicator is represented by a, b, c, d . . . n. The combined probability value, Pb, for each control mode is then calculated as follows:

$$Pb = (a.b.c.d. \ldots n)/((a.b.c.d. \ldots n) + (1-a).(1-b).(1-c).(1-d). \ldots (1-n))$$

Any number of individual probabilities may be input to the probability algorithm 120a and any one probability value input to the probability algorithm may itself be the output of a combinational probability function.

Once the combined probability value for each control mode has been calculated, the subsystem control program corresponding to the control mode with the highest probability is selected within the selector module 120 and an output signal 130 providing an indication of this is provided to the subsystem control module 114. The benefit of using a combined probability function based on multiple terrain indicators is that certain indicators may make a control mode (e.g. GGS or MR) more or less likely when combined together, compared with basing the selection on just a single terrain indicator alone.

A further control signal 131 from the selector module 120 is provided to a control module 134. In phase (2), an integration process is implemented continually within the selector module (120) to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 120 determines that the current terrain control mode (for GGS) is to be updated to a new, alternative control mode (in this example, the sand control mode). A control output signal 130 is then output from the selector module 120 to the subsystem control module 114 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

In the present embodiment, the VCU 110 is also operable to cause the subsystems to assume configurations appropriate to relatively aggressive driving in which relatively high rates of acceleration and deceleration are experienced, and relatively high values of lateral acceleration during cornering. In the present embodiment, this mode configuration of the subsystems is referred to as a dynamic mode. In the dynamic mode, a torque map relating accelerator pedal position and engine output torque is steepened compared with the general or SP OFF driving mode. That is, the amount of engine torque generated for a given driving mode is greater in the dynamic mode compared with the general mode. In addition, a suspension system of the vehicle 1 is stiffened such that an amount of force required to cause a given amount of travel of a wheel of the vehicle 1 relative to a body of the vehicle 1 is increased. In some embodiments having stop/start functionality in which the engine 11 is arranged to be switched off when the vehicle is stationary and automatically to restart when the accelerator pedal 161 is depressed, the VCU 110 may be arranged to suspend stop/start functionality when the vehicle is operated in the dynamic mode.

The VCU 110 is also operable to cause the vehicle 1 to assume an eco mode in which the subsystems assume configurations appropriate to economy-oriented driving. In the eco mode, stop-start functionality is enabled in the present embodiment, and an accelerator pedal/torque demand map is softened relative to the dynamic mode such that the amount of engine torque delivered for a given accelerator pedal position is reduced relative to the dynamic and SP OFF driving modes. The suspension of the vehicle 1 is set to a stiffness corresponding to that of the SP OFF driving mode.

When operating in the four wheel drive mode with PTC 22 closed and clutches 27 of RDU 30 configured to transmit drive torque to the rear wheels 14, 15, the driveline controller 40 monitors a speed of the front wheels 12, 13 relative to the rear wheels 14, 15 based on the wheel speed signals generated by the wheel speed sensors. The controller continually determines whether, at any time, a speed of any one of the front wheels 12, 13 exceeds a speed of any one of the rear wheels 14, 15 by more than a prescribed amount speed_diff. In the present embodiment, speed_diff is set equal to 5 kph for speeds under 50 kph, and 10% of vehicle speed for speeds in excess of 50 kph. Other values are also useful.

If the difference in wheel speed front to rear does exceed the value speed_diff, the controller 40 is configured to check whether any of the following conditions are met:
 (a) the VCU 110 is controlling the vehicle subsystems 112*a*-112*e* to operate in the sand mode; or
 (b) the vehicle is ascending a slope having a gradient that exceeds a prescribed gradient value gradient_val and an amount of powertrain torque at an input to the PTC 22 is less than a prescribed torque value PTC_torque.

In an exemplary embodiment, gradient_val may be 10% and PTC_torque may be 100 Nm. Other values of gradient_val and PTC_torque are also useful.

One or more conditions other than conditions (a) and (b) may be prescribed, in addition to or instead of either or both of conditions (a) and (b).

In the present embodiment, if neither of conditions (a) and (b) are met and the difference in wheel speed front to rear exceeds speed_diff, the controller is configured to command a PTC reconnect operation. In performing the PTC reconnect operation the controller 40 commands the PTC 22 to open and close three times in rapid succession. By rapid succession is meant that the PTC 22 is commanded to assume the open condition; once the open condition has been attained the PTC 22 is commanded to assume the closed condition; once the closed condition has been attained the PTC 22 is commanded to assume the open condition again, and so forth. It is to be understood that in the open condition the dog clutch is released such that the first dog clutch element 22*e* and the second dog clutch element 22*f* are moved apart from one another, and the male and female portions 22*d*, 22*e* of synchroniser 22syn are separated such that their opposed faces, which are in physical contact when the PTC 22 is in the closed condition, no longer touch. In the closed condition, the male and female portions 22*d*, 22*e* of synchroniser 22syn are in abutment with one another, and the first and second dog clutch elements 22*c*, 22*f* are urged together. When the PTC 22 is correctly closed, the teeth of the first and second dog clutch elements 22*c*, 22*f* engage with one another thereby allowing torque transmission between the male and female portions 22*d*, 22*e* with substantially no slip therebetween when the male portion is driven by the gearbox 18. If the PTC 22 is incorrectly closed, meshing of the teeth either does not occur or is only partial such that slip may occur between the first and second dog clutch elements 22*c*, 22*f*.

It is to be understood that a difference in wheel speed front to rear, speed_diff, can indicate failure of PTC 22 correctly to close, resulting in failure of teeth of the first and second dog clutch elements 22*c*, 22*f* correctly to engage with one another. By performing the reconnect operation when such a speed difference is detected, subject to conditions (a) and (b) being met, the failure can often be remedied quickly.

In some embodiments, if the first dog clutch element 22*c* does not disengage from the female portion 22*d* of synchroniser 22syn at the sprung ball bearing 22*a*1 then the controller 40 may perform the reconnect operation by causing the PTC 22 to assume a partially open condition, once the PTC 22 has assumed the partially open condition the controller 40 being configured to cause the PTC 22 to assume a fully closed condition. In the partially open condition, an amount of pressure urging the male and female portions 22*d*, 22*e* together is reduced such that slip between the portions is intended However, if one or both of conditions (a) and (b) are met, the controller 40 suspends performance of reconnect operations. Accordingly, a reconnect operation is not performed even if a speed of one or both of the front wheels exceeds that of the rear wheels by more than the value of parameter speed_diff.

In some embodiments, if reconnect operations are suspended due to condition (a) being met, a reconnect operation may still be permitted under conditions in which an amount of powertrain torque, for example an amount of powertrain torque applied at the input shaft of the PTC 22, is less than a prescribed amount. This is because a driver is less likely to be inconvenienced if the reconnect operation is performed when the powertrain torque demand is relatively low PCT_torque reconnect. In some embodiments the reconnect operation may be permitted when in sand mode in dependence on accelerator pedal position, optionally only when the accelerator pedal position corresponds to an amount of travel of less than a prescribed amount, for example less than 5% of travel. Other values are also useful.

It will be appreciated that although described herein with relation to a sand operating mode, identification of other modes wherein wheel slip may be expected, for example in wet mud, may also be used to suspend reconnect operations.

Figure 4:
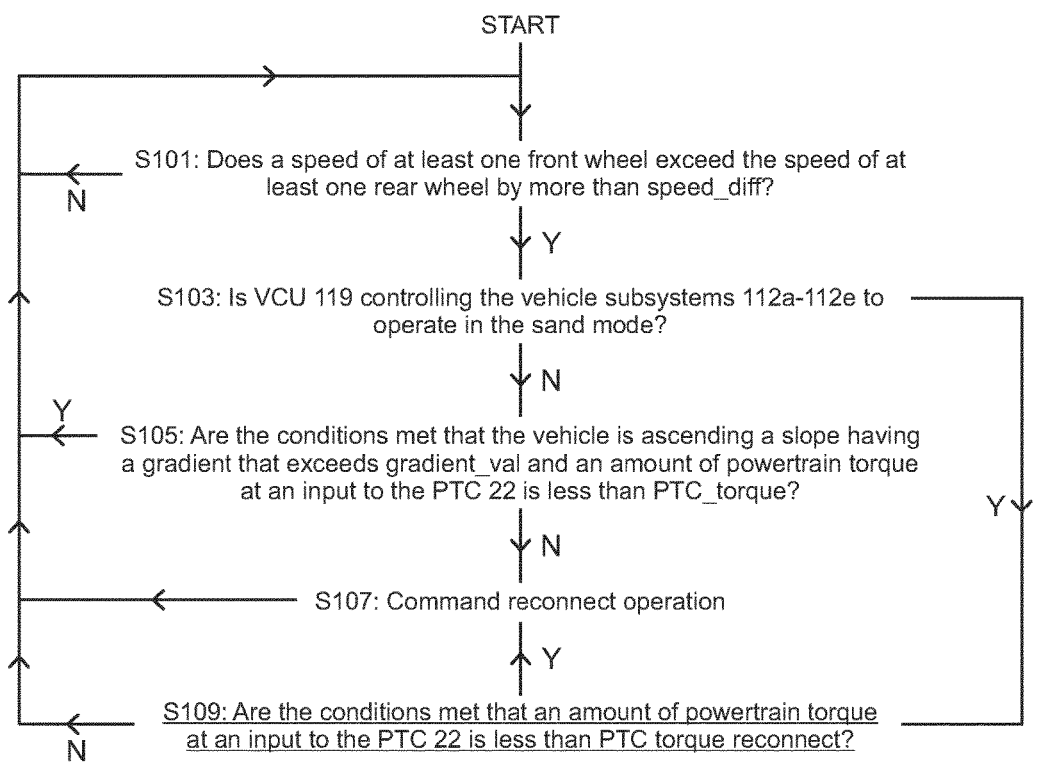
FIG. 4 is a flow diagram of a method of operation of a driveline in a vehicle according to the embodiment of FIG. 1.

FIG. 4 illustrates a method according to an embodiment of the present invention implemented by the controller 40.

At step S101 the controller 40 checks whether a speed of at least one front wheel exceeds a speed of at least one rear wheel by more than the parameter speed_diff. If this condition is not met, the controller repeats step S101. If this condition is met the controller 40 continues at step S103.

At step S103 the controller 40 checks whether the VCU 110 is controlling the vehicle subsystems 112*a*-112*e* to operate in the sand mode. If this condition is met the controller continues at step S109. Otherwise the controller 40 continues at step S105.

At step S105 the controller 40 checks whether both of two conditions are met, being the conditions that the vehicle is ascending a slope having a gradient that exceeds a value gradient_val, and the condition that an amount of powertrain torque applied to input shaft 22IN of the PTC 22 is less than PTC_torque. If both of these conditions are met, the controller continues at step S101. Otherwise, the controller 40 continues at step S107.

At step S109 the controller 40 checks whether a condition that an amount of powertrain torque applied to input shaft 22IN of the PTC 22 is less than PTC_torque reconnect is met. If this condition is met, the controller continues at step S107. Otherwise, the controller 40 continues at step S101.

At step S107 the controller 40 commands the reconnect operation. When the reconnect operation is complete, the controller continues at step S101.

Embodiments of the present invention have the advantage that, if a power transfer clutch such as PTC 22 fails correctly to close such that slippage occurs across the PTC 22, a vehicle controller detects the slippage by reference to a difference in speed between front and rear wheels of a vehicle. The controller then takes action to attempt to close the clutch correctly. However, in certain circumstances the reconnect operation is not permitted. In one case, the reconnect operation is not permitted when it is determined that the vehicle 1 may be driving on sand. This is so as to prevent triggering of the reconnect operation either where temporary opening of the PTC 22 has occurred due to vibrations associated with driving over sand, or where front wheels of the vehicle 1 have momentarily lost contact with ground due to bouncing of the wheels over the driving surface as described above.

In a second case, if a vehicle is driving up a slope having a gradient exceeding a prescribed value gradient_val and at the same time the powertrain torque at the input shaft of the PTC 22 exceeds PTC_torque, the reconnect operation is not permitted. This is to prevent the compromising of vehicle progress over terrain that may result if a reconnect operation is triggered when in fact the PTC 22 is correctly closed. As described above, a reconnect operation may be triggered when front wheels of the vehicle rotate faster than rear wheels of the vehicle by more than the value of speed_diff due to front wheels of the vehicle driving over ground of reduced surface mu, with the PTC 22 correctly closed. If the vehicle is negotiating difficult conditions, on-road or off-road, where increases in front wheel speed relative to rear wheel speed exceed speed_diff regularly due to surface mu differences, vehicle progress may be compromised and a user inconvenienced. Accordingly, embodiments of the present invention have the advantage that user inconvenience may be reduced, and vehicle composure enhanced, by preventing a reconnect operation from being performed when the vehicle is ascending a slope with an amount of powertrain torque exceeding a prescribed amount. In some embodiments the reconnect operation may be performed when the gradient and powertrain torque conditions are met regardless of whether a vehicle is driving on-road or off-road, whilst in some alternative embodiments the reconnect operation may be allowed only when the vehicle is operating in a prescribed one or more off-road driving modes.

In some embodiments, suspension of the reconnect operation may be performed whenever the vehicle is determined to be driving off-road, regardless of gradient. In vehicles having a plurality of selectable driving modes including at least one off-road driving mode, suspension of the reconnect operation may be commanded whenever the vehicle is determined to be driving in a prescribed one or more driving modes, optionally in an off-road driving mode, regardless of gradient. In some embodiments, suspension of the reconnect operation may be commanded when the vehicle is operating in any off-road driving mode, whilst in some alternative embodiments suspension of the reconnect operation may be commanded only when the vehicle is operating in a selected one or more off-road modes.

The selected driving mode may be determined by reference to a signal indicative of a position of a driving mode selector In some embodiments, when the speed of one or more front wheels exceeds that of one or more rear wheels by more than the value of parameter speed_diff, and suspension of a reconnect operation is in force, driveline controller 40 is configured to cause the first and second dog clutch elements 22*c*, 22*f* to be urged together with greater force than would otherwise be the case. This is so as to prevent or reduce an amount of any movement of the dog clutch elements 22*c*, 22*f* away from one another due to vibration of the PTC 22, for example due to travel over terrain inducing severe vibration of the PTC 22. Embodiments of the present invention may be understood by reference to the following numbered paragraphs:

1. A motor vehicle controller comprising a computing device, the controller being configured to command a first releasable torque transmitting device of a driveline to switch between a released condition in which a first releasable torque transmitting device substantially prevents transmission of torque from an input to an output portion thereof, and an engaged condition in which said first releasable torque transmitting device allows torque transmission from said input portion to said output portion thereof, wherein the controller is configured to receive information indicative of: a speed of wheels of a first axle; a speed of wheels of a second axle; and a terrain over which a vehicle is driving, and in response to a detected disparity between the speed of wheels of said first and second axle when said first releasable torque transmitting device is switched to said engaged condition, said controller is configured to, in dependence upon said received information indicative of the terrain over which the vehicle is travelling, either:

output a signal to automatically cause said first releasable torque transmitting device to perform a reconnect operation comprising momentarily resuming the released condition, and then subsequently resuming the engaged condition, or maintain said first releasable torque transmitting device in said engaged condition.

2. A controller according to paragraph 1 wherein said controller is configured to either: output a signal to automatically cause said first releasable torque transmitting device to perform a reconnect operation comprising resuming the released condition momentarily, before subsequently resuming the engaged condition, or maintain said first releasable torque transmitting device in said engaged position, further dependence at least in part on an amount of torque developed by a powertrain at a prescribed location of a powertrain.

3. A controller according to paragraph 1 wherein said controller is configured to either: output a signal to automatically cause said first releasable torque transmitting device to perform a reconnect operation comprising momentarily resuming the released condition, before subsequently resuming the engaged condition, or maintain said first releasable torque transmitting device in said engaged position, in dependence on the information in respect of a speed of wheels of a first axle with respect to wheels of a second axle when the received information indicative of the terrain over which the vehicle is travelling meets one or more predetermined conditions.

4. A controller according to paragraph 3 configured to output said signal to automatically cause said first releasable torque transmitting device to perform a reconnect operation if a speed of a wheel of a first axle exceeds that of a second axle by more than a prescribed amount when the received information indicative of the terrain over which the vehicle is travelling meets said or more predetermined conditions.

5. A controller according to paragraph 3 wherein the one or more predetermined conditions comprise one or more of: the controller received information indicative that a gradient of terrain exceeds a prescribed gradient in an uphill direction; the terrain over which a vehicle is moving consists essentially of sand; and the vehicle is configured in a sand mode of operation.

6. A controller according to paragraph 1 configured to receive information indicative of a terrain over which a vehicle is driving by receiving a signal indicative of the identity of an operating mode in which a vehicle is operating, the operating mode being selected from a plurality of operating modes.

7. A controller according to paragraph 6 configured to in determining whether to output said signal, determine from signals indicative of the terrain over which a vehicle is driving, which of a plurality of operating modes a vehicle is operating in.

8. A controller according to paragraph 6 configured to determine whether to output said signal in dependence on a state of a manual operating mode selector dial.

9. A controller according to paragraph 6 configured to determine whether to output said signal in dependence upon determining which of the plurality of operating modes has been selected automatically by an automatic operating mode selector.

10. A motor vehicle control system comprising a controller according to paragraph 1.

11. A control system according to paragraph 10 wherein the controller is configured to receive information indicative of a terrain over which a vehicle is driving by receiving a signal indicative of the identity of an operating mode in which a vehicle is operating, the operating mode being selected from a plurality of operating modes, wherein the operating modes are control modes of at least one subsystem of a vehicle, the control system having a subsystem controller for initiating control of a vehicle subsystem in the selected one of the plurality of subsystem control modes, each one of the operating modes corresponding to one or more different driving conditions for a vehicle.

12. A control system according to paragraph 11 wherein the system comprises an evaluator for evaluating one or more driving condition indicators to determine the extent to which each of the subsystem control modes is appropriate.

13. A control system according to paragraph 10 wherein the controller is configured to determine whether to output said signal in dependence upon determining which of the plurality of operating modes has been selected automatically by an automatic operating mode selector, the system being operable in an automatic operating mode selection condition in which the system is configured automatically to control the subsystem controller to initiate control of the or each subsystem in the subsystem control mode which is most appropriate.

14. A control system according to paragraph 11 wherein the operating modes include one or more control modes selected from the following:

control modes of at least one vehicle subsystem selected from amongst an engine management system, a transmission system, a steering system, a brakes system and a suspension system;

control modes of a suspension system and the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain controller and an accelerator or throttle pedal, the subsystem configuration modes providing different levels of responsiveness of the powertrain controller to movement of the accelerator or throttle pedal;

control modes of a traction control system which is arranged to control wheel spin, and said plurality of subsystem configuration modes allow different levels of said wheel spin control modes of a yaw control system which is arranged to control vehicle yaw, and said plurality of subsystem configuration modes allow different levels of divergence of said vehicle yaw from an expected yaw;

control modes of a range change transmission and said subsystem configuration modes may include a high range mode and a low range mode of said transmission; and control modes of a transmission system operable in a plurality of transmission ratios and including a transmission controller arranged to monitor at least one parameter of the vehicle and to select the transmission ratios in response, and wherein the subsystem configuration modes include a plurality of transmission configuration modes in which the transmission ratios are selected differently in response to said at least one parameter.

15. A control system according to paragraph 10 wherein the controller is configured to receive information indicative of a terrain over which a vehicle is driving by receiving a signal indicative of the identity of an operating mode in which a vehicle is operating, the operating mode being selected from a plurality of operating modes, wherein in each operating mode the system is configured to cause each one of a plurality of vehicle subsystems to be operated in a subsystem configuration mode appropriate to the driving condition.

16. A control system according to paragraph 10, the system further comprising a first releasable torque transmitting device of a driveline.

17. A control system according to paragraph 16 wherein said first releasable torque transmitting device of a driveline is configured to, in response to said signal output by said controller, switch between the engaged position to a released condition and back to an engaged position, so as to perform a reconnect operation.

18. A vehicle comprising a control system according to paragraph 10.

19. A vehicle according to paragraph 18 wherein first releasable torque transmitting device comprises a clutch device.

20. A vehicle according to paragraph 19 wherein the clutch device comprises an interference-type clutch.

21. vehicle according to paragraph 18 wherein the clutch device comprises a friction clutch device.

22. A vehicle according to paragraph 19 wherein the clutch device comprises the input portion, the output portion and a synchroniser for synchronising a speed of rotation of the input and output portions when the first releasable torque transmitting device transitions from the released condition to the engaged condition.

23. A method of controlling a motor vehicle having a driveline, the method being implemented by means of a computing device, the device being configured to command a first releasable torque transmitting device of the driveline to switch between a released condition in which said first releasable torque transmitting device substantially prevents transmission of torque from an input to said output portion thereof, and an engaged condition in which a releasable torque transmitting device allows torque transmission from said input portion to said output portion thereof, the method comprising:

receiving by means of a controller information indicative of: a speed of wheels of a first axle; a speed of wheels of a second axle; and a terrain over which a vehicle is driving, and detecting a disparity between the speed of wheels of said first and second axle when said first releasable torque transmitting device is in said engaged condition, when a disparity is detected the method comprising, in dependence upon said received information indicative of the terrain over which the vehicle is travelling either:

outputting a signal to automatically cause said first releasable torque transmitting device to perform a reconnect operation comprising a momentary resumption of the released condition, and subsequently resuming the engaged condition, or maintaining said first releasable torque transmitting device in said engaged condition.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle control device for controlling a vehicle, comprising:

a controller comprising a computing device, the controller being configured to command a first releasable torque transmitting device of a driveline to switch between a released condition in which said first releasable torque transmitting device prevents transmission of torque from an input portion to an output portion, and an engaged condition in which said first releasable torque transmitting device allows torque transmission from said input portion to said output portion;

the controller being configured to receive information indicative of: a speed of first wheels of a first axle; a speed of second wheels of a second axle; and a terrain over which the vehicle is driving; and in response to a detected disparity between the speed of first wheels of said first axle and the speed of second wheels of said second axle when said first releasable torque transmitting device is switched to said engaged condition, said controller is configured to, in dependence upon said received information indicative of the terrain over which the vehicle is travelling, either:

output a signal to automatically cause said first releasable torque transmitting device to perform a reconnect operation comprising momentarily resuming the released condition, and then subsequently resuming the engaged condition, or maintain said first releasable torque transmitting device in said engaged condition.

2. The motor vehicle control device according to claim 1, wherein said controller is configured in dependence at least in part on an amount of torque developed by a powertrain at a prescribed location of a powertrain to either:
output the signal, or
maintain said first releasable torque transmitting device in said engaged condition.

3. The motor vehicle control device according to claim 1, wherein said controller is configured, based on the received information indicative of the terrain meeting at least one predetermined condition, to either:
output the signal, or
maintain said first releasable torque transmitting device in said engaged condition.

4. The motor vehicle control device according to claim 3, wherein the controller is configured to output said signal if a speed of at least one of the first wheels of said first axle exceeds the speed of at least one of the second wheels of said second axle by more than a prescribed amount when the received information indicative of the terrain over which the vehicle is travelling meets said at least one predetermined condition.

5. The motor vehicle control device according to claim 3, wherein the at least one predetermined condition comprises one or more of:
the received information indicating that a gradient of the terrain exceeds a prescribed gradient in an uphill direction;
the terrain consists essentially of sand; and
the vehicle is operating in a sand mode.

6. The motor vehicle control device according to claim 1, wherein the controller is configured to receive the information indicative of the terrain by receiving a signal indicative of the identity of an operating mode of the vehicle, the operating mode being selected from a plurality of operating modes.

7. The motor vehicle control device according to claim 6, wherein the controller is configured to determine whether to output said signal by determining which of a plurality of operating modes the vehicle is operating in from signals indicative of the terrain.

8. The motor vehicle control device according to claim 6, wherein the controller is configured to determine whether to output said signal in dependence on a state of a manual operating mode selector dial.

9. The motor vehicle control device according to claim 6, wherein the controller is configured to determine whether to output said signal in dependence upon determining which of the plurality of operating modes has been selected automatically by automatic operating mode selection means.

10. The motor vehicle control device according claim 6, wherein the at least one operating mode includes a plurality of subsystem control modes of at least one subsystem of the vehicle, the control device having a subsystem controller for initiating control of a vehicle subsystem in a selected one of the plurality of subsystem control modes, each one of the operating modes corresponding to one or more different driving conditions for the vehicle.

11. The motor vehicle control device according to claim 10, wherein the control device comprises evaluation means for evaluating one or more driving condition indicators to determine the extent to which each of the subsystem control modes is appropriate.

12. The motor vehicle control device according to claim 10, wherein the control device is operable in an automatic operating mode selection condition in which the control device is to configured automatically control the subsystem controller to initiate control of the or each subsystem which is most appropriate in the subsystem control mode.

13. The motor vehicle control device according to claim 10, wherein the at least one operating mode includes one or more control modes selected from the following:
control modes of at least one vehicle subsystem selected from among an engine management system, a transmission system, a steering system, a brake system and a suspension system;
control modes of a suspension system and the plurality of subsystem control modes comprise a plurality of ride heights;
control modes of a fluid suspension system in which fluid interconnection can be made between suspensions for wheels on opposite sides of the vehicle, and wherein said plurality of subsystem control modes provide different levels of said interconnection;
control modes of a steering system which provides steering assistance, and wherein said plurality of subsystem control modes provide different levels of steering assistance;
control modes of a brake system which provides braking assistance, and said plurality of subsystem control modes provide different levels of braking assistance;
control modes of a brake control system which provides an anti-lock function to control wheel slip, and said plurality of subsystem control modes allow different levels of wheel slip;
control modes of a powertrain system which includes a powertrain control means and an accelerator or throttle pedal, the subsystem control modes providing different levels of responsiveness of the powertrain control means to movement of the accelerator or throttle pedal;
control modes of a traction control system which is arranged to control wheel spin, and said plurality of subsystem control modes allow different levels of wheel spin; control modes of a yaw control system which is arranged to control vehicle yaw, and said plurality of subsystem control modes allow different levels of divergence of said vehicle yaw from an expected yaw;
control modes of a range change transmission and said subsystem control modes include a high range mode and a low range mode of said transmission; and
control modes of a transmission system operable in a plurality of transmission ratios and including a transmission control means arranged to monitor at least one parameter of the vehicle and to select the transmission ratios based on the at least one parameter, and wherein the subsystem control modes include a plurality of transmission configuration modes in which the transmission ratios are selected differently in response to said at least one parameter.

14. The motor vehicle control device according to claim 6, wherein in each operating mode the control device is configured to cause each one of a plurality of vehicle subsystems to be operated in a subsystem configuration mode appropriate to a driving condition.

15. The motor vehicle control device according to claim 1, wherein said first releasable torque transmitting device of a driveline is configured to, in response to said signal output by said controller, switch between the engaged position to a released condition and back to an engaged position, so as to perform a reconnect operation.

16. A vehicle comprising:
a releasable torque transmitting device; and
a controller comprising a computing device, the controller being configured to command the releasable torque transmitting device to switch between a released condition in which said releasable torque transmitting device prevents transmission of torque from an input portion to an output portion, and an engaged condition in which said releasable torque transmitting device allows torque transmission from said input portion to said output portion;
the controller being configured to receive information indicative of: a speed of first wheels of a first axle; a speed of second wheels of a second axle; and a terrain over which the vehicle is driving; and
in response to a detected disparity between the speed of first wheels of said first axle and the speed of second wheels of said second axle when said releasable torque transmitting device is switched to said engaged condition, said controller is configured to, in dependence upon said received information indicative of the terrain over which the vehicle is travelling, either:
output a signal to automatically cause said releasable torque transmitting device to perform a reconnect operation comprising momentarily resuming the released condition, and then subsequently resuming the engaged condition, or
maintain said releasable torque transmitting device in said engaged condition.

17. The vehicle according to claim 16, wherein the first releasable torque transmitting device comprises a clutch device.

18. The vehicle according to claim 17, wherein the clutch device comprises an interference-type clutch.

19. The vehicle according to claim 17, wherein the clutch device comprises a friction clutch device.

20. The vehicle according to claim 17, wherein the clutch device comprises the input portion, the output portion and a synchronizer for synchronizing a speed of rotation of the input portion and output portion when the first releasable torque transmitting device transitions from the released condition to the engaged condition.

21. A method of controlling a motor vehicle having a driveline, the method being implemented by a computing device configured to command a first releasable torque transmitting device of the driveline to switch between a released condition in which said first releasable torque transmitting device prevents transmission of torque from an input portion to an output portion, and an engaged condition in which said first releasable torque transmitting device allows torque transmission from said input portion to said output portion, the method comprising:
receiving information indicative of: a speed of first wheels of a first axle; a speed of second wheels of a second axle; and a terrain over which the vehicle is driving; and
detecting a disparity between the speed of first wheels of said first axle and the speed of second wheels of said second axle when said first releasable torque transmitting device is in said engaged condition;
when a disparity is detected the method comprising, in dependence upon said received information indicative of the terrain over which the vehicle is travelling, either:
outputting a signal to automatically cause said first releasable torque transmitting device to perform a reconnect operation comprising a momentary resumption of the released condition, and subsequently resuming the engaged condition, or
maintaining said first releasable torque transmitting device in said engaged condition.

* * * * *